United States Patent Office 3,261,819
Patented July 19, 1966

3,261,819
PREPARATION AND POLYMERIZATION OF 1,2-DIVINYL ETHYLENE OXIDE
Eugene L. Stogryn, Fords, and Anthony J. Passannante, Metuchen, N.J., assignors to Esso Research and Engineering Company, a corporation of Delaware
No Drawing. Filed Aug. 22, 1962, Ser. No. 219,368
3 Claims. (Cl. 260—88.3)

This invention relates to a method for preparing and polymerizing the unsaturated epoxide, 1,2-divinyl ethylene oxide, which has the formula:

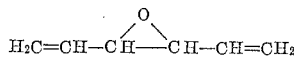

The utility of this symmetrical unsaturated epoxide containing two double bonds depends on the fact that it can be polymerized to polymers having a wide range of molecular weights, low molecular weight and high molecular weight, having a high amount of unsaturation in the vinyl group attached to each carbon atom in the polymer chain. The high molecular weight polymers having these characteristics possess plastic or elastomeric properties, depending upon the selection of the catalyst used for performing polymerization.

The polyether formed from the symmetrical dienic epoxide, 1,2-divinyl ethylene oxide, in its simplest preparation has terminal hydroxyl groups. These hydroxy terminated polyethers can be chain extended by reaction with reactants, such as diisocyanates, diacyl halides, diacids, to form higher molecular weight copolymers, such as polyurethanes and polyesters. Moreover, the unsaturated polyethers having the pendant vinyl groups,

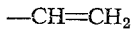

are reactive in such reactions as halogenation, nitration, oxidation, and in general in various readily performed addition reactions without destruction of the polymer's generally desired physical characteristics. The high molecular weight polymers of 1,2-divinyl ethylene oxide, which are obtained by polymerization through the epoxy ring, possess distinct advantages over known saturated or less unsaturated polyethers in that the reactive pendant vinyl groups are suitable sites for crosslinking reactions to give three-dimensional network polymers.

The examples set forth herein are intended to serve as an illustration of the preferred and improved techniques for the preparation of 1,2-divinyl ethylene oxide monomer, its polymers, and modifications thereof. Variations which do not depart from the principles and scope of the invention will become apparent to those skilled in the art.

EXAMPLE 1

Preparation of 1,2-divinyl ethyl oxide

To a rapidly stirred suspension of 3,4-dihydroxy 1,5-hexadiene, $H_2C:CH \cdot CHOH \cdot CHOH \cdot CH:CH_2$, 228 grams, and 41.6 grams of calcium chloride was added 190 grams of acetyl chloride over a period of 45 minutes. During the course of addition, the reaction mixture was maintained at a temperature between 0° and 10° C. The stirred mixture was slowly brought to room temperature and stirring was continued for 24 to 48 hours. At the end, the reaction mixture was warmed to 50° C. for 1 hour. The reaction mixture was then poured into ice and extracted with ether. The ether layer was neutralized with a saturated solution of sodium bicarbonate. The ether layer was dried over anhydrous potassium carbonate, filtered, and the ether removed by distillation. In this fashion there was obtained 269 grams of the crude chloroester, 3-chloro 4-acetoxy 1,5-hexadiene,

In a 1- liter 4-neck flask fitted with a stirrer, dropping funnel, distillation head, and a condenser and receiver, there was placed 362 grams of sodium hydroxide pellets, 362 grams of potassium hydroxide pellets and 36.2 grams of water, together with sufficient white oil to permit facile agitation of this mixture. This flask was placed in the sand bath and the bath heated to 170° C. At this temperature, 257 grams of crude 3-chloro 4-acetoxy 1,5-hexadiene was dripped in slowly. The pressure in this apparatus was reduced so that an overhead temperature of 90° to 100° C. was maintained. In this fashion, there was collected in the distillation receiver a mixture of water and crude 1,2-divinyl ethylene oxide. Divinyl ethylene oxide thus prepared was separated from the water by extraction with diethyl ether; the ether solution was then dried over magnesium sulfate and distilled at atmospheric pressure. The fraction boiling at 108° C. to 112° C. weighted 48.5 grams.

The preferred reactions for preparing the 1,2-divinyl ethylene oxide are shown in the following equations:

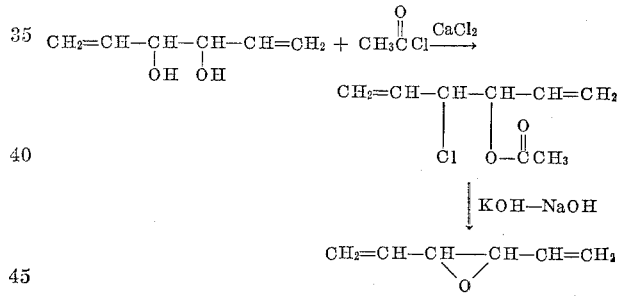

A distillation cut of the final product having a boiling point of 110° to 112° C. under 771 mm. Hg abs. pressure gave the elemental analysis corresponding to $C_6H_8O$ and the infrared spectra was found consistent with the structure assigned.

Polymerization of 1,2-divinyl ethylene oxide

Table I given below serves to illustrate the catalysts that one can utilize for the polymerization of 1,2-divinyl-ethylene oxide to yield either low molecular weight polymers or high molecular weight polymers. This table only serves to illustrate the catalyst that can be utilized for this epoxide polymerization and is not intended to be restrictive.

TABLE I

| Monomer | Catalyst | Time, days | Temperature | Properties |
|---|---|---|---|---|
| Divinyl ethylene oxide | $PF_5 \cdot THF$ [1] | 3 | Ambient | Pale yellow solid. |
| Do | $Al(i-Bu)_3 \cdot H_2O$ [2] | 2 | do | Yellow solid plus viscous liquid. |
| Do | $NaOCH_3$ | 3 | 100° C | Viscous liquid. |
| Do | $PF_5$ | 3 | Ambient | Do. |
| Divinyl ethylene oxide plus $H_2O$ (9:1 molar ratio). | $PF_5$ | 2 | do | Do. |

[1] THF is tetrahydrofuran.
[2] Triisobutyl aluminum treated with one mole of $H_2O$.

The polymers obtained in these experiments are unsaturated polyethers, viz. they contain a polyethylene oxide chain with a substituent vinyl group on each carbon in the polymer chain, as represented in the following formula of the recurring unit:

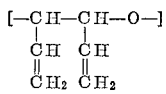

This structure is confirmed by the infrared spectra of the polymers. These polymers contain appreciable hydroxyl functionality which can be utilized in the preparation of polyurethanes and acrylate derivatives useful as synthetic rubbers, textile sizes, etc.

The recurring unit will be present in the polymer a number of times, e.g. 2 upwards to about 100 or more, depending on the molecular weight, which in turn depends on the purity of the divinyl ethylene oxide monomer, the catalyst and polymerization conditions. The molecular weight of the polymers may vary in the range of about 200 to about 10,000 and higher.

As has been shown, a preferred method of preparation for obtaining the desired divinyl ethylene oxide monomer for polymerization into high molecular weight or low molecular weight polymers is obtained through the conversion of the symmetrical dihydroxy hexadiene to the chloroester, which in turn is converted by reaction with the alkali to the epoxide without adverse effects on the vinyl groups.

The polymerization of the symmetrical divinyl ethylene oxide is carried out with known types of polymerization catalysts that have been used on epoxy alkanes for making polyethers, but with the unexpected preservation of the reactive pendant vinyl groups. The following examples illustrate the conditions of the polymerization reactions which have been summarized in the preceding Table I.

EXAMPLE 2

To 10 parts by weight of the divinyl ethylene oxide prepared as described in Example 1 is added 1 part of phosphorous pentafluoride-tetrahydrofuran complex. The monomer and catalyst mixture is stirred and maintained at ambient or room temperature (20°–30° C.) for three days to form a pale yellow solid polymer having the recurring unit described.

EXAMPLE 3

The divinyl ethylene oxide monomer is polymerized with 10% of the triisobutyl aluminum-water catalyst (prepared by treating one mole of Al(i-Bu)$_3$ in n-heptane with one mole of H$_2$O). The polymerization was carried out over a period of two days at ambient temperature to form a polymer product which is a yellow solid and viscous liquid.

EXAMPLE 4

The divinyl ethylene oxide monomer mixed with 5% of sodium methylate reacts in three days at a polymerization temperature of 100° C. to form a viscous liquid having the desired composition.

EXAMPLE 5

In a mixture of the divinyl ethylene oxide monomer with water in a 9:1 molar ratio, 0.5% of PF$_5$ catalyst is used for the polymerization over a period ranging up to three days at room temperature to form the desired viscous liquid polymer.

The OH functionality of these polyethers can be increased by polymerization of divinyl ethylene oxide in the presence of an OH-containing modifier, such as water, ethylene glycol, trimethylol propane, glycerol, and pentaerythritol. For example, the water-modified polyether described in the above examples has appreciably higher OH content than the corresponding polyether which was prepared in the absence of water.

As indicated in the examples, the amounts of catalyst may be varied, e.g. from 0.1 to 10% by weight of the unsaturated expoxide monomer and is preferably in the range of 0.5 to 2% thereof. The polymerization temperature may be varied in the range of from about 0° C. to elevated temperatures of from about 100° to 150° C. It is not necessary to employ solvents or diluents in the polymerization, but solvents and diluents inert or which act as modifiers may be used.

The invention described is claimed as follows:

1. As a new composition of matter, a homopolymer of 1,2-divinyl ethylene oxide containing the recurring unit.

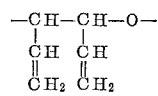

2. Process for the polymerization of 1,2-divinyl ethylene oxide, which comprises polymerizing 1,2-divinyl ethylene oxide in the presence of 0.1 to 10% by weight of a polymerization catalyst chosen from the group consisting of PF$_5$, PF$_5$-tetrahydrofuran complex, aluminum triisobutyl-water and NaOCH$_3$ at a polymerization reaction temperature in the range of about 0° C. to about 150° C. and recovering said polymer.

3. Process for the polymerization of 1,2-divinyl ethylene oxide which comprises polymerizing 1,2-divinyl ethylene oxide in the presence of 0.1 to 10% by weight of PF$_5$ as the catalyst for a period up to 3 days at a temperature of 20° to 30° C. to obtain a viscous liquid polymer containing the recurring unit:

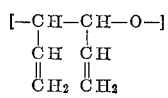

and recovering the polymer.

References Cited by the Examiner

UNITED STATES PATENTS

| | | | |
|---|---|---|---|
| 2,349,770 | 5/1944 | Tendick | 260—348 |
| 2,393,129 | 1/1946 | Tendick | 260—348 |
| 2,594,452 | 4/1952 | Kosmin | 260—67.6 |
| 2,756,242 | 7/1956 | Riener | 260—348 |
| 2,860,146 | 11/1958 | Furam et al | 260—348.6 |
| 2,965,652 | 12/1960 | Gaertner | 260—348.6 |
| 3,012,044 | 12/1961 | Hudson | 260—348 |
| 3,018,294 | 1/1962 | Phillips et al | 260—348 |
| 3,065,213 | 11/1962 | Vandenberg | 260—88.3 |
| 3,158,591 | 11/1964 | Vandenberg | 260—88.3 |

OTHER REFERENCES

Meltzer et al.: Chem. Abs., vol. 48 (1954) p. 3290g.

JOSEPH L. SCHOFER, *Primary Examiner.*

LEON D. ROSDOL, *Examiner.*

J. W. WHISLER, H. WONG, *Assistant Examiners.*